United States Patent [19]

White et al.

[11] Patent Number: 5,423,956
[45] Date of Patent: Jun. 13, 1995

[54] ELECTROCHEMICAL PROCESS FOR THE PRODUCTION OF CONDUCTING POLYMER FIBERS

[75] Inventors: Henry S. White, Salt Lake City, Utah; Christopher W. Macosko, Minneapolis, Minn.; Shulong Li, Golden, Colo.

[73] Assignee: Regents of the University of Minnesota, Minneapolis, Minn.

[21] Appl. No.: 85,659

[22] Filed: Jul. 1, 1993

[51] Int. Cl.⁶ .......................... C25B 3/02; C25D 13/08
[52] U.S. Cl. ...................................... 204/59 R; 204/78; 205/50; 205/148; 205/159; 205/164; 205/317
[58] Field of Search ................. 205/50, 164, 159, 138, 205/317, 148; 204/59 R

[56] References Cited

U.S. PATENT DOCUMENTS 4,585,652  4/1986  Miller et al. .......................... 424/83
4,738,757  4/1988  Naarmann .......................... 205/317

OTHER PUBLICATIONS

*Chem. Eng. News*, p. 22, (Feb. 15, 1993).
*Chem. Eng. News*, pp. 38–39 (Sep. 10, 1984).
*Inside R&D*, vol. 22, No. 10, pp. 1–2 (Mar. 10, 1993).
*Kirk–Othmer Concise Encyclopedia of Chemical Technology*, M. Grayson, ed., Wiley–Interscience, pp. 471–475 (1989) (no month).
*Kirk–Othmer Concise Encyclopedia of Chemical Technology*, M. Grayson, ed., Wiley–Interscience, pp. 922–923 (1989) (no month).
N. C. Billingham, et al., *Adv. Poly. Sci.*, 90, 1 (1989) (no month).
D. D. C. Bradley, et al., *Synth. Metals*, 17, 473 (1987) (no month).
A. Dall'Olio, et al., *Comptes rendes hebdomadaires des seances de l'Academie des sciences*, C267, 433 (1968) (no month).
M.-A. De Paoli, et al., *J. Polym. Sci.: Polym. Chem. Ed.*, 23, 1687 (1985) (no month).
A. F. Diaz, et al., *J. Chem. Soc., Chem. Comm.*, 635 (1979) (no month).

D. J. Earl, et al., *Ind. Eng. Chem. Res.*, 30(1), 264 (1991) (no month).
M. Feldhues, et al., *Synth. Metals*, 28, C487 (1989) (no month).
M. B. Gieselman, et al., *Macromolecules*, 23, 3118 (1990) (no month).
A. J. Heeger, et al., *Synth. Metals*, 41–43, 1027 (1991) (no month).
J. Heinze, *Top. Curr. Chem.*, 152, 1 (1990) (no month).
D. Jeon, et al., *Science*, 256, 1662 (Jun. 1992).
K. K. Kanazawa, et al., *J. Chem. Soc., Chem. Comm.*, 854 (1979) (no month).
K. Kaeriyama, et al., *Synth. Metals*, 28, C611 (1989) (no month).
P. Lang, et al., *Polymer*, 28, 668 (1987) (no month).
S. Li, et al, *Science*, 259, 957 (Feb. 1993).
S. E. Lindsey, et al., *Synth. Metals*, 10, 67 (1984/1985) (no month).
J. M. Machado, et al., *Polymer*, 30, 1992 (1989) (no month).
F. Motamedi, et al., *Polymer*, 33(5), 1102 (1992) (no month).
H. Nemoto, et al., *Synth. Metals*, 41–43, 415 (1991) (no month).
R. M. Penner, et al., *J. Electrochem. Soc.*, 133(10), 2206 (1986) (no month).
L. P. Rector, et al., *Synth. Metals*, 41–43, 935 (1991) (no month).
J. R. Reynolds, et al., *Polym. Mater. Sci. & Eng.*, 64, 202 (1991) (no month).

(List continued on next page.)

*Primary Examiner*—John Niebling
*Assistant Examiner*—Edna Wong
*Attorney, Agent, or Firm*—Schwegman, Lundberg & Woessner

[57] ABSTRACT

A process is provided to prepare flexible composite polymer fibers by electrochemically forming a coating of a conductive organic polymer on the outer surface of a polymeric fiber.

10 Claims, 4 Drawing Sheets

OTHER PUBLICATIONS

S. D. D. V. Rughooputh, et al., *Synth. Metals*, 21, 41 (1987) (no month).
R. I. Stankovic, et al., *Eur. Polym. J.*, 26(6), 675 (1990) (no month).
G. Tourillon, et al., *J. Phys. Chem.*, 87, 2289 (1983) (no month).
G. Tourillon, et al., *J. Electroanal. Chem.*, 161, 51 (1984) (no month).
L. F. Warren, et al., *J. Electrochem. Soc.*, 134(1), 101 (Jan. 1987).
U. G. Wettermark, et al., *Polym. Mater. Sci. & Eng.*, 64, 267 (1991) (no month).
C.-J. Zhong, et al., *Chem. Mater.*, 3, 787 (1991) (no month).

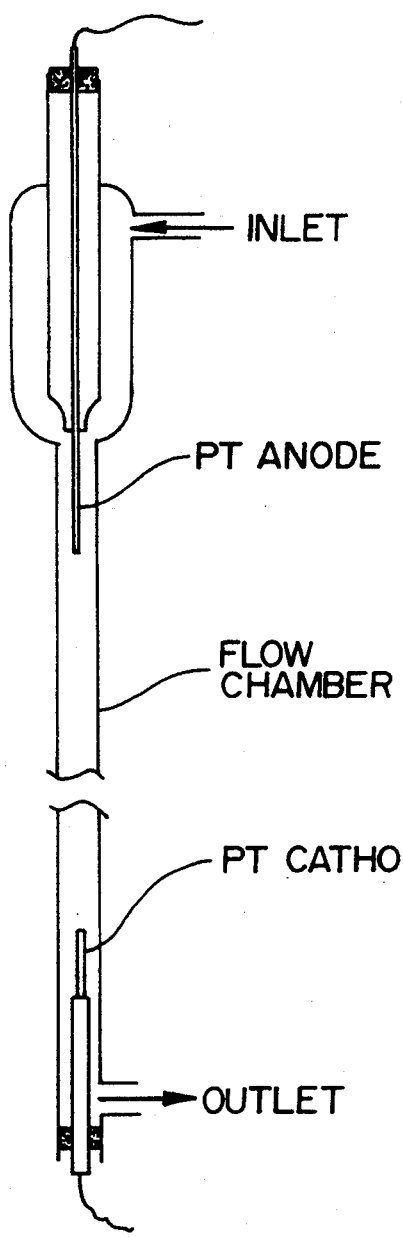
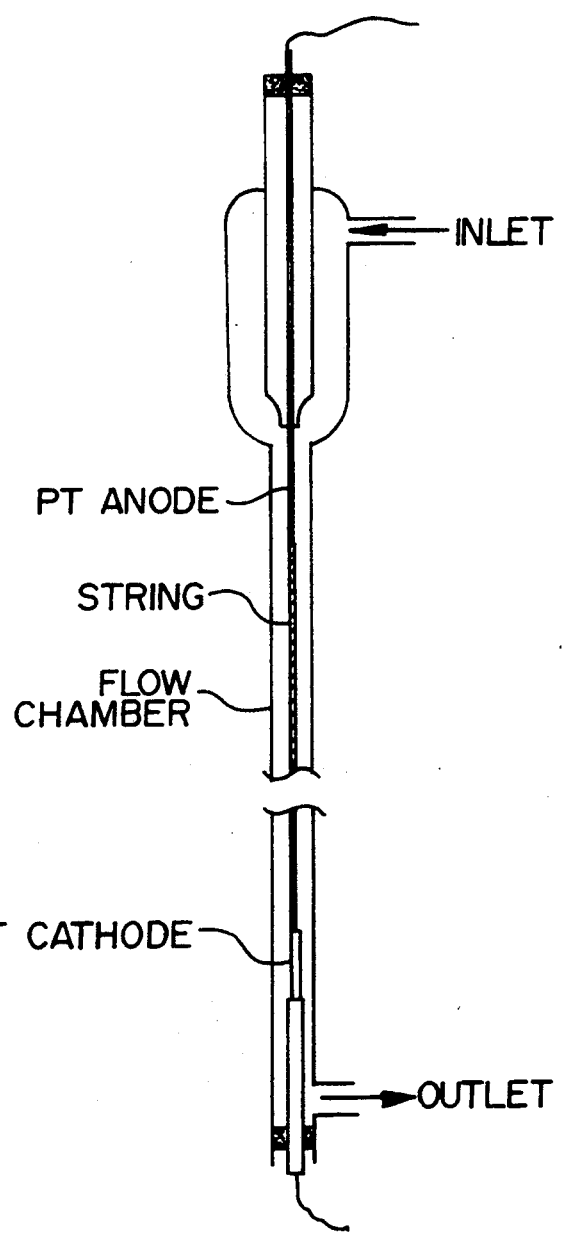
*Fig. 1a*
*Fig. 1b*

ELECTROCHEMICAL PROCESS FOR THE PRODUCTION OF CONDUCTING POLYMER FIBERS

This invention was made with the support of the U.S. Government under Office of Naval Research grant no. N/N 00014-91-J-1927 and National Science Foundation grant no. ECD-8721551. The U.S. Government has certain rights in the invention.

BACKGROUND OF THE INVENTION

The electrical conductivity ($\sigma$) of most organic materials at room temperature is quite small ($\sigma < 10^{-10}$ ohm$^{-1}$cm$^{-1}$). Over the last two decades, the synthesis of organic molecules with electrical properties approaching those of metals have been the focus of considerable attention. Because organic polymers generally have elasticity, strength and plasticity, they offer significant advantages over non-polymeric materials in the manufacture of electronic materials. Macromolecular substances can now be tailored to perform as semiconductors or even as true organic metals.

The field of organic metals is dominated by two types of molecular structures: linearly conjugated $\pi$-systems and charge-transfer complexes which form stacks of $\pi$-systems in the solid state. In the former systems, electrons move rapidly along a partially oxidized or reduced molecular chain. Examples of linear $\pi$-conjugated systems are the heteroaromatic polymers such as polypyrroles, polythiophenes, polyanilines, polyacetylenes and polyarylenes. In charge-transfer complexes, electrons move along a partially oxidized or reduced stack of molecules. Examples of this type of conductive polymer include stacks of 7,7,8,8-tetracyanoquinodimethane (TCNQ) radical anions stabilized by polycations. See, R. I. Stankovic et al., *Eur. Polym. J.*, 26, 675 (1990). In either case, the electrical, optical and magnetic properties are a complex function of the solid state structure, and efforts have been made to prepare and study model compounds for these systems, primarily in solution.

The high electrical conductivity of heteroaromatic polymers has spurred interest in the use of these materials in novel electronic and chemical applications. See D. Jean et al., *Top. Curr. Science*, 256, 1662 (1992); J. Heinze, *Top. Curr. Chem.*, 152, 1 (1990); N. C. Billingham et al., *Adv. Polym. Sci.*, 90, 1 (1989); and A. J. Heeger et al., *Synth. Metals*, 41, 1027 (1991). Prototype designs of flexible light-emitting diodes, molecular transistors, light battery electrodes, electrochemical displays, electrodes for in vivo drug delivery and anticorrosion films, in which a conductive polymer is the active element, have been realized during the past decade. See, L. L. Miller et al. (U.S. Pat. No. 4,585,652) and S. Li et al., *Science*, 259, 957 (1993) and references cited therein. However, most electrically conductive polymers have undesirable characteristics such as insolubility, intractability, low resistance to water or heat, poor processability or, in some cases, low molecular weights. These disadvantages prevent the use of conventional polymer-processing techniques to shape these materials into desired structures. With respect to conductive polymer fibers, processing methods have been disclosed which require multistep chemical or mechanical procedures. For example, see D. D. C. Bradley et al., *Synth. Metals*, 17, 473 (1987); J. M. Machado et al., *Polymer*, 30, 1992 (1989); and P. Smith et al., *Polymer*, 33, 1102 (1992).

Therefore, a continuing need exists for simplified methods which yield polymer fibers which exhibit a desirable spectrum of mechanical properties while retaining high electrical conductivity.

SUMMARY OF THE INVENTION

The present invention provides a simple electrochemical method to prepare a flexible conductive composite polymer fiber comprising an organic polymer fiber core coated with a conductive heteroaromatic polymer. The composite fibers are prepared by electrochemically oxidizing or reducing a flowing electrolyte solution comprising an appropriate monomer or monomer mixture in an electrochemical cell comprising an anode and a cathode, so as to deposit the coating of the conductive heteroaromatic polymer on the fiber core which is preferably nonconductive. A flow of the electrolyte solution is established between the electrodes and the fiber core is positioned in the flowing solution along the axis of the cell, so as to connect the upstream electrode to the region of the downstream electrode. Hydrodynamic fields within the cell result in unidirectional growth of the conductive polymer coating on the fiber core in the direction of the axis of the flow cell, i.e., from the anode to the region of the cathode in the case of deposition of the polymer by oxidation of the monomer. The resulting composite fibers exhibit high mechanical strength, flexibility and conductivity.

Thus, in one embodiment, the present invention provides a method for preparing a conductive composite polymer fiber comprising:

(a) providing an electrochemical flow cell comprising an anode, a cathode, a flow of an electrolyte solution from the region of the anode to the region of the cathode, and a polymer fiber connected to the anode and extending in the direction of the flow of the electrolyte solution toward the cathode, wherein the electrolyte solution comprises a monomer selected from the group consisting of an aromatic monomer, a heteroaromatic monomer and mixtures thereof which can be oxidized to a conductive polymer selected from the group consisting of an aromatic polymer, a heteroaromatic polymer and an aromatic-heteroaromatic polymer; and (b) electrochemically oxidizing the monomer to deposit an adherent coating of the cationic conductive polymer on the polymer fiber, so as to provide a flexible, conductive composite polymer fiber.

Of course, if it is desired to deposit an anionic conductive polymer on the nonconductive polymer fiber, the electrolyte solution is flowed from the region of the cathode to the region of the anode, and a cathodic current is used to reduce the monomer, so as to deposit an adherent coating of the anionic conductive polymer on the fiber, which coating grows from the cathode in the direction of the anode.

The electrolyte solution is prepared by dissolving the monomer or monomer mixture in water and/or in a suitable organic solvent, which preferably also comprises a dissolved anionic surfactant, such as a sulfonate salt, i.e., an aromatic sulfonate or a polyvinyl sulfonate. The electrolyte solution flow rate, applied current, deposition rate of the conductive polymer, and fiber thickness can be varied widely, as discussed hereinbelow.

In *Science*, 259, 957 (1993), we described the synthesis of conducting polymer fibers of macroscopic dimensions. Specifically, fibers of poly(3-methylthiophene), abbreviated hereafter as poly(3-MT), of length greater than 10 cm and diameter between 0.1 and 0.7 mm were grown from the tip of a platinum electrode by galvanic oxidation of 3-MT in a capillary flow cell:

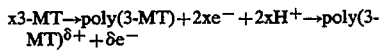

wherein δ+ is about 0.25 per monomer unit.

By adjusting the flow velocity, applied current, and 3-MT concentration, polymer fibers were obtained at a linear growth rate of about 1 cm/hr and at an about 80% current efficiency. In contrast, as disclosed by P. Lang et al., *Polymer*, 28, 668 (1987), oxidation of 3-MT in stagnant solutions, or at rotating disk electrodes, resulted in the deposition of a thin film ($\leq 1$ μm) on the electrode surface.

In contrast to these single-phase fibers, which are extremely brittle and mechanically weak, the composite fibers of the present invention exhibit excellent mechanical properties, while maintaining the electrical conductivity and electrochemical properties associated with thin films of conductive heteroaromatic polymers such as poly(3-MT) or polypyrrole. In addition to this improvement of the physical properties, the present method for preparing composite fibers also provides a 30-fold increase or more in the fiber growth rate.

BRIEF DESCRIPTION OF THE FIGURES

FIG. 1 is a schematic cross section of the electrochemical flow cells used to produce: (a) conducting single phase polymer fibers and (b) composite polymer fibers.

DETAILED DESCRIPTION OF THE INVENTION

Core Fiber

Figure 2A:
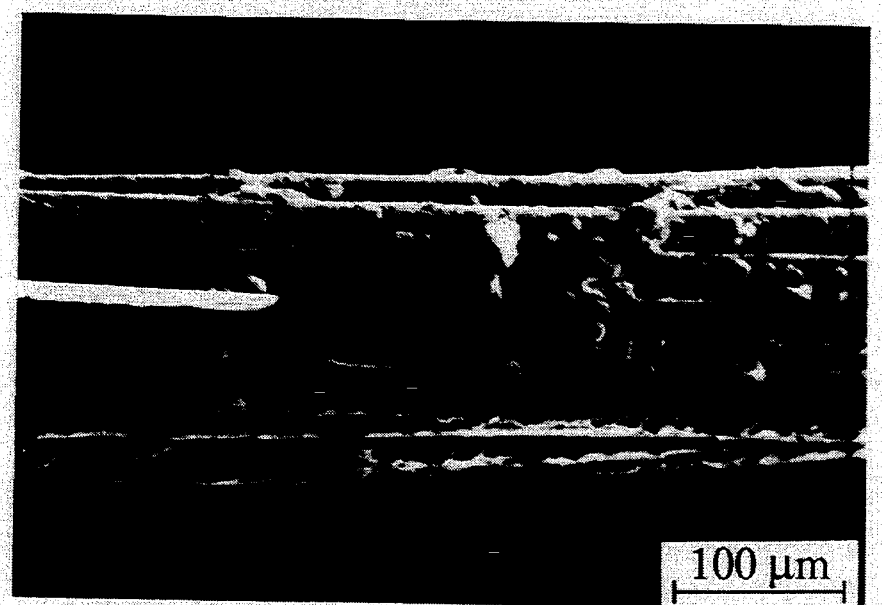
FIG. 2 depicts SEM images of the (a) side and (b) cross section of a Kevlar/polypyrrole composite fiber prepared in CH$_3$CN containing 0.5M pyrrole and 0.1 TBA$^{30}$TS$^-$.

The composition of the core fiber is not critical to the practice of the present method. It may be conducting or nonconducting, although nonconducting fibers are preferred for most applications. Preferred fibers are "manmade" or "chemical" fibers, although natural fibers may be satisfactory for some applications. The fibers may be single-component, bicomponent or multicomponent, and may be monofilament or multi-filament, e.g., woven. Therefore, preferred core fibers include acetates (cellulose acetate and triacetate), acrylics (including $\geq 85\%$ acrylonitrile), aramids (polyamides, wherein at least 85% of the amide linkages comprise two aromatic rings), azlon, glass, modacrylic (35–85% acrylonitrile) novoloid (cross-linked novolac), nylon (polyamides in which at least 85% of amide linkages are directly attached to two aromatic rings; nylon-6,6, nylon-6), nytril (vinylidene-dinitrile), olefins (polyethylene, polypropylene, etc.), polyester (at least 85% of an ester of a substituted aromatic carboxylic acid, polycarbonates, i.e., Kevlar), rayon, saran (vinylidene chloride), spandex (polyurethane), vinol (vinyl alcohols), vinyon (vinyl chloride), and mixtures thereof. See, *Kirk-Othmer Concise Encyclopedia of Chemical Technology*, M. Grayson, ed., Wiley-Interscience (1989) at pages 471–475 and 922–923. The thickness and total length of the core fiber can be varied widely, and are not critical to the practice of the invention.

Conductive Polymers

Any conductive polymer or conductive polymer-nonconductive polymer complex that can be formed or deposited in a coherent body or film by electrochemical oxidation or reduction of a monomer or mixture of monomers is suitable for use in the present method. As discussed above, conductive polymers are generally classified as those comprising linearly conjugated π-systems, such as the aromatic or heteroaromatic polymers, and the charge-transfer complexes which form stacks of π-systems in the solid state.

Of the first class, cationic charged polymers such as those comprising substituted or unsubstituted aromatic or heteroaromatic six- to ten-membered rings such as thiophene, thiophenol, aniline, phenyl, pyrrole, pyridyl, cyclopentadienyl and thiafulvalenyl can be used in the invention. Preferably, the rings will be linked into a continuous conjugated, π-electron network, such as those present in polyaromatic or poly-(pseudoaromatic) systems. Preferred classes of conductive polymers include the polypyrroles, which are formed by the electrochemical oxidation of a pyrrole as described by A. F. Diaz et al. in *J. Chem. Soc. Chem. Commun.*, 635, 854 (1979), and G. Tourilion et al., *J. Phys. Chem.*, 87, 2289 (1987).

Polythiophene and several beta-substituted polythiophenes have been prepared by electrochemical oxidation and polymerization of their respective monomers, and are also preferred for use in the present method. These polymers can be repeatedly cycled between a conductive oxidized state and a semi-conductive neutral state. See G. Tourilion, *J. Electroanal. Chem.*, 161, 51 (1984).

Anionic charged conductive polymers can come from the classes of polyacetylenes as well as polyaromatics or poly(heteroaromatics). For example, poly(9-phenylquinoline) charged negatively, and would be formed by anodic reduction of 9-phenylquinoline. For example, see *Chem. Eng. News* (Sep. 10, 1984) at pages 38–39.

Members of the second class, the charge-transfer complexes, have also been developed which can be used in the present invention. The construction of macromolecular complexes from cationic polymer and monomeric anion radicals, such as TCNQ$^-$, is by far the most widely utilized route to this type of conductive polymer. For example, C. J. Zhong et al., *Chem. Mat.*, 3, 787 (1991) disclose conductive polymer films formed by electroprecipitation of π-stacks of a disulfonate imide anion radical and a polycation, which acts to stabilize the π-stacks. For other examples, see U.S. patent application Ser. No. 849,744, filed Mar. 12, 1992.

The concentration of the monomer or monomers in the electrolyte solution can be varied widely, and will be somewhat dependent on the base solvent, electrolyte salt and flow rate selected. Preferably, the total monomer concentration is about 0.1–1M.

The Electrochemical Flow Cell

FIGS. 1a and 1b schematically depicts electrochemical flow cells suitable for the production of single-phase conductive polymer fibers (1(a)) and composite conductive polymer fibers (1(b)), under galvanostatic control. As shown, the anode and cathode are preferably platinum wires and the flow cells are oriented essentially vertically. Electrolyte solutions containing the monomer and a supporting electrolyte are pumped into the cell through the entrance port in the vicinity of the electrode from which growth is to be initiated, i.e., the anode. Volumetric flow rates are preferably varied between 10 and 50 ml/s using a centrifugal pump (not shown). As shown, the Pt anode is encapsulated in glass, so as to extend past the end of the glass insulation into the flow chamber, and positioned in the center of the flow chamber.

Oxidation of a monomer such as pyrrole or 3-MT at the Pt anode in the cell shown in FIG. 1a results in growth of a single fiber attached to the end of the electrode. To form a composite fiber, a nonconductive filament or string of a synthetic ("chemical") polymer is placed in the center of the flow chamber by attaching one end of the filament or string to the end of the anode and the other end to the stopper near the exit port, in the vicinity of the cathode, as shown in FIG. 1b, using a nonconductive adhesive. Oxidation of the monomer at the anode results in growth of the conductive polymer onto and along the nonconductive fiber, which becomes encased with a continuous coating of the conductive polymer.

The electrolyte solution is formed by dissolving the monomer and an electrolyte salt in water or in a suitable organic solvent, such as acetonitrile, methylene chloride, acetone, nitrobenzene, tetrahydrofuran, dimethylformamide or mixtures thereof, including mixtures with water. Suitable electrolyte salts include those organic acid salts commonly referred to as anionic surfactants. Useful compounds of this class include sulfonates such as the alkali metal salts of sulfated ethylenoxy fatty alcohols (the sodium or ammonium sulfates of the condensation products of about 1–4 moles of ethylene oxide with a $C_{12}$–$C_{15}$ n-alkanol, i.e., the Neodol ® ethoxysulfates, such as Neodol ® 25-3S, Shell Chemical Co.); salts having alkyl substituents of 8 to 22 carbon atoms such as the water-soluble higher fatty acid alkali metal soaps, e.g., sodium myristate and sodium palmitate. Another useful class of anionic surfactants encompasses the water-soluble sulfated and sulfonated anionic alkali metal and alkaline earth metal detergent salts containing a hydrophobic higher alkyl moiety (typically containing from about 8 to 22 carbon atoms) such as salts of higher alkyl mono or polynuclear aryl sulfonates having from about 1 to 16 carbon atoms in the alkyl group (e.g., sodium dodecylbenzenesulfonate, magnesium tridecylbenzenesulfonate, lithium or potassium pentapropylenebenzenesulfonate). These compounds are available as the Bio-Soft ® series, i.e., Bio-Soft ® D-40 (Stephan Chemical Co., Northfield, Ill.).

Other useful classes of anionic surfactants include the alkali metal salts of sulfonsuccinic acid esters, e.g., dioctyl sodium sulfosuccinate (Monawet ® series, Mona Industries, Inc., Patterson, N.J.); the alkali metal salts of alkyl naphthalene sulfonic acids (methyl naphthalene sodium sulfonate, Petro ® AA, Petrochemical Corporation); sulfated higher fatty acid monoglycerides such as the sodium salt of the sulfated monoglyceride of coconut oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); sodium $C_{14}$–$C_{16}$-alpha-olefin sulfonates such as the Bio-Terge ® series (Stephan Chemical Co.); alkali metal salts of higher fatty esters of low molecular weight alkylol sulfonic acids, e.g., fatty acid esters of the sodium salt of isethionic acid; the fatty ethanolamide sulfates; the fatty acid amides of amino alkyl sulfonic acids, e.g., lauric acid amide of taurine; as well as numerous other anionic organic surface active agents such as sodium xylene sulfonate, sodium naphthalene sulfonate, sodium toluene sulfonate, as well as the preferred sodium p-toluenesulfonate, sodium polystyrene sulfonate, sodium polyvinyl sulfonate, and mixtures thereof.

In general, these organic surface active agents are employed in the form of their alkali metal salts, ammonium or alkaline earth metal salts at about 0.25–5% by weight of the electrolyte solution.

The invention will be further described by reference to the following detailed examples, wherein a Pine Instrument RDE 4 potentiostat-galvanostat was used to supply a constant current to the cell. The conductivity of the fibers is measured using the 4-point probe method described in *Science*, 259, 957 (1992). Electrical contacts to the polymer fiber can be made using silver epoxy. Scanning electron microscope images were obtained using a JEOL II 840 electron microscope operating at 10 kV. Cyclic voltammetry was performed using a EG&G PAR model 173 potentiostat and model 175 programmer.

Pyrrole, 3-methylthiophene (3-MT) sodium polystyrenesulfonate ($Na^+PSS^-$), sodium dodecylbenzenesulfonate ($Na^+DBS^-$), tetrabutylammonium p-toluenesulfonate ($TBA^{30}$ $TS^-$) and sodium polyvinylsulfonate ($Na^+PVS^-$) were purchased from Aldrich Chem. Co. and used as received. Bis(triphenylphosphoanylidene)ammonium polystyrenesulfonate ($PPN^+PSS^-$) was prepared by metathesis of $Na^+PSS^-$ and $PPN^+Cl^-$ (Aldrich), washed with deionized water and dried under vacuum. Kevlar (Goodfellow Co., 70 filaments with a filament diameter of 0.0167 mm) and polyester strings (0.1 mm diameter) were used without pretreatment.

EXAMPLE 1

Poly(3-MT) Fibers

Poly(3-MT) fibers ten cm in length were grown in the two-electrode electrochemical flow cell shown in FIG. 1a. As shown in FIG. 1a, the main body of the cell consists of a glass capillary, 3 mm in inner diameter, 15 cm in length, which is oriented vertically. The electrolyte solution is pumped through the cell with a centrifugal pump (Cole-Parma, Model 07002-60). Polymer fibers were grown from a Pt wire 127 μm in diameter, which is encapsulated in glass with about one cm of the wire extending past the glass insulation. This electrode is positioned in the center of the capillary about 5 cm from the entrance port. A second Pt wire 1 μm in diameter and about 2 cm long, is positioned at the bottom of the tube near the exit port, forming a flow chamber about 10 cm in length. The electrolyte solution consisted of acetonitrile ($CH_3CN$) containing 0.5M 3-MT and 0.1M TBAP. The electrolyte solution was pumped through the cell at 30 cm/s (2 ml s$^{-1}$) while 3-MT was oxidized at the upper Pt wire by passing an anodic current (1.8 mA) through this electrode. Initially, a thin film of poly(3-MT) is deposited uniformly over the surface of the electrode. Continued oxidation of 3-MT at constant current resulted in the growth of a single fiber of uniform diameter from the Pt anode at about 0.8 cm/hr. In all experiments, the fiber grew along the axial center of the flow capillary without touching the capillary walls. Depending on the flow velocity and applied current, the growth rate of poly(3-MT) fibers could be varied from 0.2–3 cm/hr. The conductivity of the air-dried poly(3-MT) fibers, measured along the length of a 1 cm long fiber, was about 20 (ohm cm)$^{-1}$. The poly(3-MT) fibers obtained from CH$_3$CN/TBAP solutions were very fragile and were broken easily when handled.

EXAMPLE 2

Polypyrrole Fibers

An electrolyte solution containing 0.5M pyrrole 1% Na$^+$PSS$^-$ in water was pumped through the flow cell of Example 1 at 20 cm/s and oxidized at 1 mA. A polypyrrole fiber grew from the Pt anode at 0.14 cm/hr, with a diameter of 1.1 mm.

The growth rate and diameter of the polypyrrole (PPS$^-$) fibers depended on several experimental parameters, including faradaic current, supporting electrolyte concentration and flow rate. Fibers of uniform diameter (0.5–1.0 mm) were grown at low flow velocities (10–35 cm/s). At higher flow velocities (50 cm/s), a short cone-shaped polypyrrole fiber was obtained at the tip of the electrode. Larger currents typically resulted in faster growth rates and larger diameters. Under otherwise identical conditions, polypyrrole fibers grown at a higher Na$^+$PSS$^-$ concentration (5%) have larger diameters than those grown at a lower supporting electrolyte concentration (0.5%).

The electrical conductivity of a 2 mm diameter, 4 cm long polypyrrole (PPS$^-$) fiber was determined to be 6.2 $\Omega^{-1}$cm$^{-1}$, in good agreement with the conductivity of polypyrrole films prepared in a stagnant solution. See H. Nemoto et al., Synth. Mat., 41, 415 (1991). Similarly, the infrared absorption spectrum of a polypyrrole (PPS$^-$) fiber was essentially identical to that of a polypyrrole (PPS$^-$) film prepared in a stagnant solution.

Polypyrrole (PPS$^-$) fibers are significantly harder and stronger than poly(3-MT) fibers. However, both materials were brittle and were broken when flexed.

EXAMPLE 3

Composite Fibers

Using the flow cell of Example 1, as shown in FIG. 1b, a braided polycarbonate string (Kevlar) comprised of 70 filaments (each filament of 0.016 mm diameter) was epoxied to the end of a 127 μm diameter platinum wire at the top of the flow cell, using Epoxi-Patch adhesive (Dexter). The other end of the Kevlar string was threaded through a rubber stopper at the bottom of the 10 cm flow cell, such that the Kevlar string was centered along the axis of the cell. An acetonitrile solution containing 0.5M pyrrole and 0.1M tetra(n-butyl)ammonium toluenesulfonate (TBA$^+$TS$^-$) was pumped through the cell at 2 ml/s, while passing an anodic current of 1 mA through the upper platinum electrode. Polypyrrole was observed to deposit uniformly on the surface of the upper platinum electrode. After 15 minutes, the conductive polymer grew onto the Kevlar fiber, and uniformly coated the entire length of the fiber at a rate of 5 cm/hr.

The resulting Kevlar/polypyrrole fiber had an electrical conductivity of 20 (ohm cm)$^{-1}$, as evaluated by the four-point method described hereinabove. The flexibility of the composite fiber was qualitatively tested by making a 180° bend in the fiber, and examining the fiber for cracks under an optical microscope. The fiber could be repeatedly flexed without any detectable cracking.

EXAMPLES 4–7

Composite Fibers

Using the procedure of Example 3, but varying the core filament and the electrolyte solution, yielded the composite fibers listed in Table I below.

TABLE I

Conductivity and Flexibility of Polypyrrole Composite Fibers

| Ex. | Fiber/Electrolyte | Conductivity $\sigma(\Omega^{-1}\text{cm}^{-1})$ | Flexibility |
|---|---|---|---|
| 4 | Polyester H$_2$O/Na$^+$PSS$^-$ | 4.1 | Poor |
| 5 | Polyester CH$_3$CN/TBAP | 4.1 | Poor |
| 6 | Kevlar H$_2$O/Na$^+$DBS$^-$ | 5.4 | Poor |
| 7 | Kevlar CH$_3$CN/TBA$^+$TS$^-$ | 24.3 | Good |

Figure 2B:
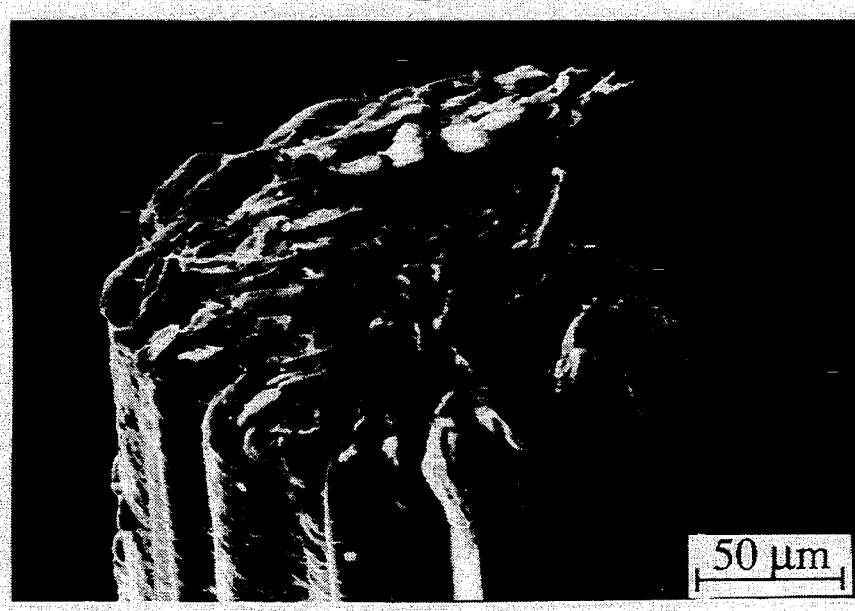
Figure 3A:
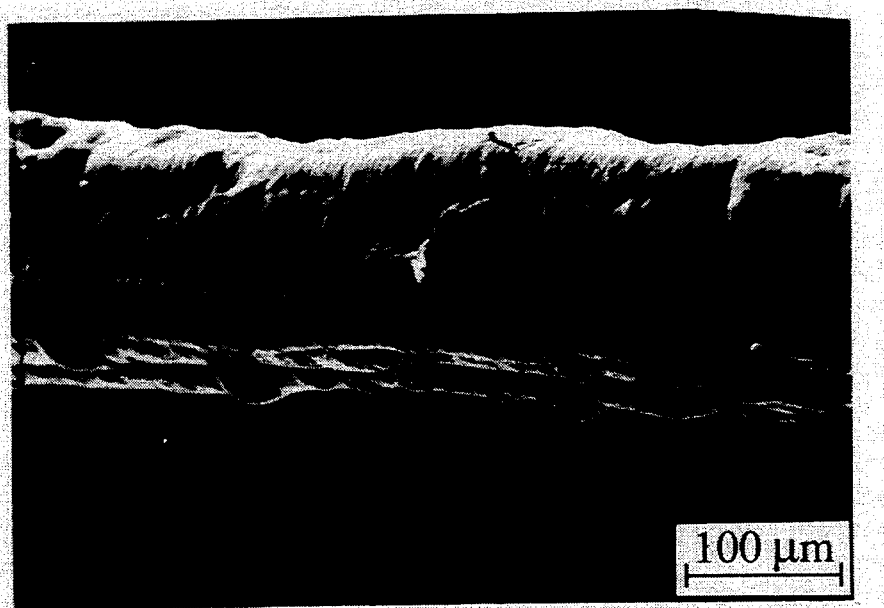
FIG. 3 depicts SEM images of the (a) side and (b) cross section of a Kevlar/polypyrrole composite fiber prepared in an aqueous solution containing 0.5M pyrrole and 0.1M Na$^+$DBS$^-$.
Figure 3B:

As demonstrated in Example 3 and by the data in Table I, conductive polyester/polypyrrole and Kevlar/polypyrrole composite fibers were successfully grown in CH$_3$CN and in aqueous solutions containing a number of different electrolytes (TBA$^{30}$ TS$^-$, Na$^+$PSS$^-$, Na$^+$DBS$^-$, Na$^+$PVS$^-$, and Na$^+$TS$^-$). SEM images of the composite fibers show that polypyrrole deposits uniformly between the filaments of the nonconductive strings, as well as on the outside surface of the strings. FIGS. 2 and 3 show SEM images of Kevlar/polypyrrole fibers grown from CH$_3$CN/TBA$^{30}$ TS$^-$ and H$_2$O/Na$^+$DBS$^-$ solutions, respectively.

Composite fibers obtained from CH$_3$CN/TBA$^{30}$ TS$^-$ solutions using Kevlar strings could be repeatedly flexed in a 180° loop without any noticeable cracking. Images of the cross-section morphology of Kevlar/polypyrrole fibers prepared using TBA$^{30}$ TS$^-$ as supporting electrolyte (FIG. 2b) show that the polymer phase undergoes plastic deformation when the fiber is cut with a razor blade, consistent with excellent flexibility of the fiber. Other fibers, including the Kevlar/polypyrrole composite fiber prepared from aqueous Na$^+$DBS$^-$ solution and shown in FIG. 3b, display smoother and sharper cross sections, indicative of a more brittle fracture.

The linear growth rate of the polypyrrole composite fibers depended strongly on the electrolyte composition and could be varied by one order of magnitude for different solvent/electrolyte combinations. The largest fiber growth rates were obtained in CH$_3$CN solutions containing 0.1M TBA$^{30}$ TS$^-$. In this solution, linear growth rates of 30 cm/hr at an applied current of 3 mA and flow rate of 20 cm/s were obtained for the deposition of polypyrrole on Kevlar. The growth rate of the polypyrrole composites did not strongly depend on the type of nonconductive string or on the solution flow rate; however, smoother fiber surfaces were obtained at higher solution flow rates.

DISCUSSION

It is believed that growth of single-phase poly(3-MT) fibers results from a decrease in the rate of 3-MT oxidation and/or oligomer deposition along the sides of the growing fiber, relative to that at the growing tip. Furthermore, since the polymer fibers grow only along the axis of the flow cell, it is clear that hydrodynamic flow patterns in the cell are coupled with the kinetics of the oligomer deposition and fiber growth. The ability to synthesize polypyrrole fibers indicates that these phenomena are general and not specific to the chemistry of 3-MT. The mechanism of growth of the polymer composite fibers appears analogous to the mechanism previously described for growth of single-phase fibers; electrical conduction in the fiber allows current to flow to the end of the polymer composite phase, where 3-MT (or pyrrole) is oxidized and deposited at the interface between the nonconductive string and the polymer composite. As with the single-phase fibers, the fact that the composite fibers have a uniform diameter over lengths of 1 to 10 cm suggests that the rate of polymer deposition is significantly larger at the end of the composite polymer phase than along the sides of the composite fiber. The order of magnitude increase in fiber growth rates obtained by depositing pyrrole and 3-MT on nonconductive strings is not understood.

Figure 4A:
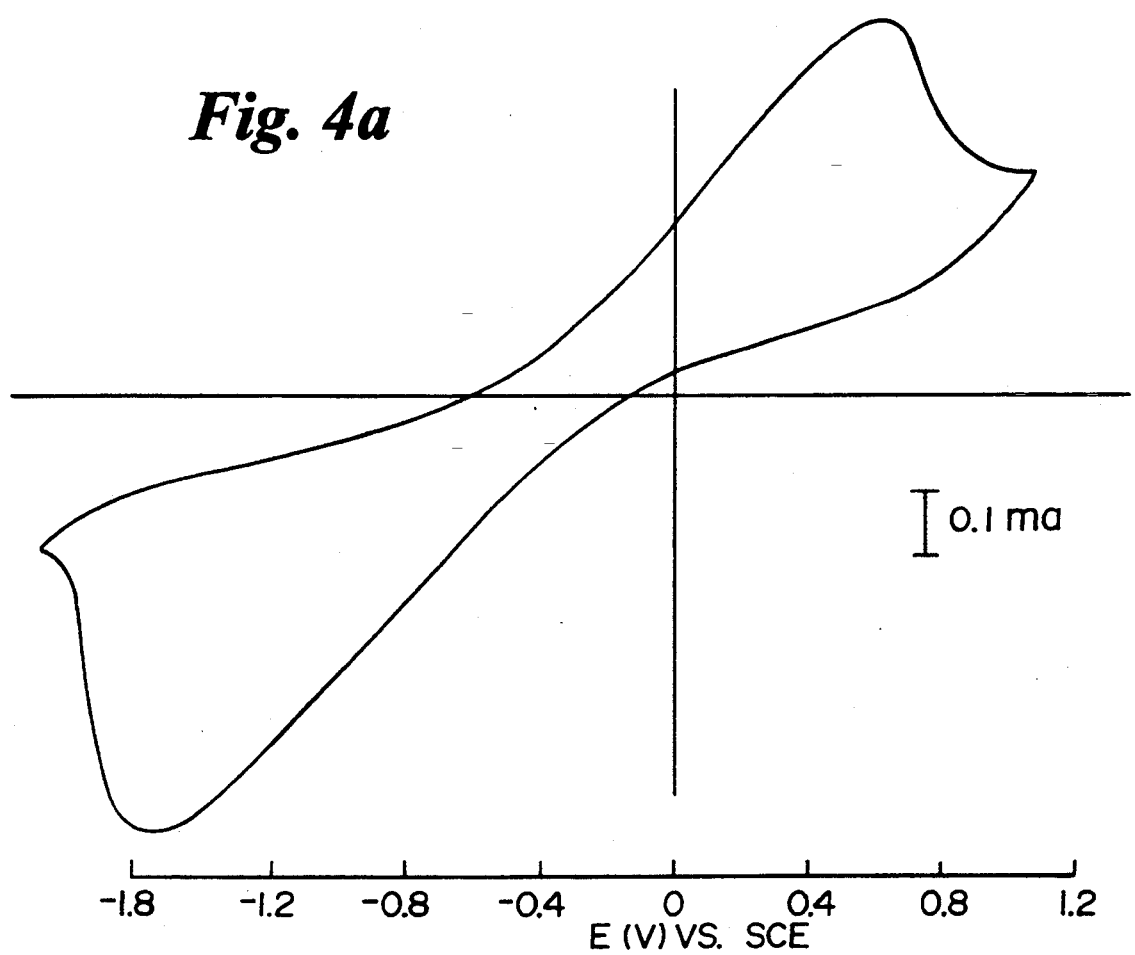
FIG. 4 depicts the cyclic voltammetric responses of: (a) a 0.7 cm long, 0.2 mm diameter Kevlar/polypyrrole composite fiber electrode; and (b) a 1 cm long 127 μm diameter Pt wire coated with a polypyrrole thin film. Both electrodes were immersed in an aqueous 0.1M NaTS solution and scanned at a rate of 50 mV/s. The composite fiber and film were grown in an CH$_3$CN solution containing 0.1M TBA$^{30}$TS$^-$ and 0.5M pyrrole.
Figure 4B:
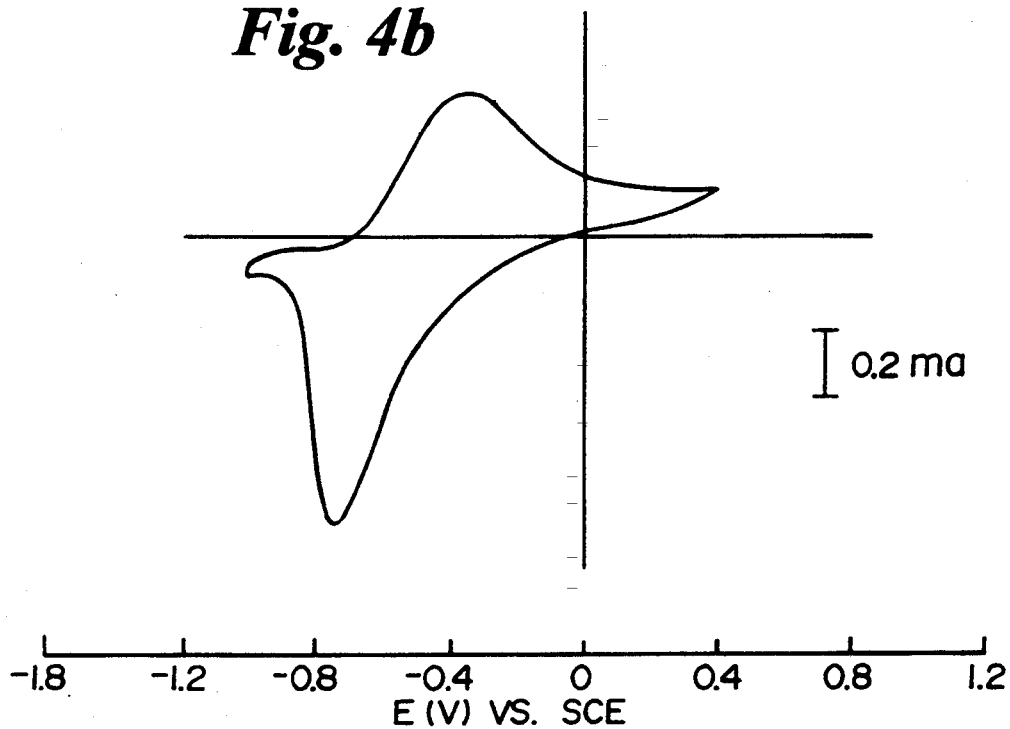

The present composite fibers have substantially improved properties relative to the single-phase poly(3-MT) or polypyrrole fibers. In addition to the demonstrated improvement in the flexibility and strength, and the strong adhesion between the nonconductive and conductive phases, the Kevlar/pyrrole fibers are electroactive and can be used as free standing electrodes. For example, FIG. 4 shows the voltammetric response of a 0.7 cm long, 0.2 mm diameter Kevlar/polypyrrole fiber in an aqueous 0.1M Na+TS− solution. Although ohmic distortion of the voltammetric waves produces a large separation between the anodic and cathodic peaks as compared to the voltammogram of the corresponding thin film (FIG. 4b), the steady-state voltammetric response qualitatively demonstrates that the fiber undergoes a chemically reversible oxidation and re-reduction. The voltammetric wave is centered at about −0.4 V (vs. SCE), in reasonable agreement with the redox potentials reported for thin polypyrrole films in aqueous solutions.

All publications, patents and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method for preparing a conductive composite polymer fiber comprising:
   (a) providing an electrochemical flow cell comprising an anode, a cathode, a flow of an electrolyte solution from the region of the anode to the region of the cathode, and a polymer fiber connected to the anode and extending in the direction of the flow of the electrolyte solution toward the cathode, wherein the electrolyte solution comprises a monomer selected from the group consisting of an aromatic monomer, a heteroaromatic monomer and mixtures thereof which can be oxidized to a conductive cationic polymer selected from the group consisting of an aromatic polymer, a heteroaromatic polymer and an aromatic-heteroaromatic polymer; and
   (b) electrochemically oxidizing the monomer to deposit an adherent coating of the cationic conductive polymer from the anode on the polymeric fiber, so as to provide a flexible, conductive composite polymer fiber.

2. The method of claim 1 wherein the polymer fiber is nonconductive.

3. The method of claim 2 wherein the nonconductive polymer fiber is a multi-filament thread.

4. The method of claims 2 or 3 wherein the nonconductive polymeric fiber is an acetate, acrylic, aramid, modacrylic, nylon, nytril, olefin, polyester, rayon, saran, spandex, vinol or vinyon fiber.

5. The method of claims 1 or 2 wherein the monomer is a heteroaromatic monomer.

6. The method of claim 5 wherein the heteroaromatic monomer is a pyrrole, a thiophene, a thiophenol or a pyridine.

7. The method of claim 6 wherein the monomer is pyrrole, and the conductive heteroaromatic polymer is a polypyrrole.

8. The method of claim 6 wherein the monomer is 3-methylthiophene, and the conductive polymer is poly(3methylthiophene).

9. The method of claim 1 wherein the electrolyte solution also comprises an anionic surfactant.

10. The method of claim 9 wherein the anionic surfactant is an aromatic sulfonate or a polyvinylsulfonate.

* * * * *

UNITED STATES PATENT AND TRADEMARK OFFICE
CERTIFICATE OF CORRECTION

PATENT NO. : 5,423,956

DATED : June 13, 1995

INVENTOR(S) : Henry S. White et al.

It is certified that error appears in the above-identified patent and that said Letters Patent is hereby corrected as shown below:

Column 1, line 45, delete "Jean" and insert therefor --Jeon--.

Column 1, line 46, delete "*Top. Curr.*".

Column 1, line 67, delete "P. Smith" and insert therefor --F. Motamedi--.

Column 3, line 36, delete "$TBA^{30}TS^-$" and insert therefor --$TBA^+TS^-$--.

Column 3, line 48, delete "$TBA^{30}TS^-$" and insert therefor --$TBA^+TS^-$--.

Column 4, line 60, delete "C.J." and insert therefor --C.-J.--.

Column 6, line 38, delete "($TBA^{30}TS^-$)" and insert therefor --($TBA^+TS^-$)--.

Column 7, line 29, delete (0.5-1.0 mm) and insert therefor --(0.5-2.0 mm)--.

Column 8, line 34, delete "$TBA^{30}\ TS^-$" and insert therefor --$TBA^+TS^-$--.

Column 8, line 41, delete "$TBA^{30}TS^-$" and insert therefor --$TBA^+TS^-$--.

Column 8, line 43, delete "$TBA^{30}TS^-$" and insert therefor --$TBA^+TS^-$--.

Column 8, line 47, delete "$TBA^{30}TS^-$" and insert therefor --$TBA^+TS^-$--.

Column 8, line 61, delete "$TBA^{30}TS^-$" and insert therefor --$TBA^+TS^-$--.

UNITED STATES PATENT AND TRADEMARK OFFICE
CERTIFICATE OF CORRECTION

PATENT NO. : 5,423,956
DATED : June 13, 1995
INVENTOR(S) : Henry S. White, et al.

It is certified that error appears in the above-indentified patent and that said Letters Patent is hereby corrected as shown below:

Column 10, line 46, delete "(3methylthiophene)" and insert therefor --(3-methylthiophene)--.

Signed and Sealed this

Twenty-fifth Day of February, 1997

Attest:

BRUCE LEHMAN

*Attesting Officer*  *Commissioner of Patents and Trademarks*